United States Patent [19]

Alsina

[11] 4,349,965
[45] Sep. 21, 1982

[54] FOUR WHEEL ALIGNMENT METHOD AND APPARATUS FOR AUTOMOTIVE VEHICLES

[75] Inventor: Pierre A. Alsina, Rochester, N.Y.

[73] Assignee: Security Trust Company of Rochester, Rochester, N.Y.

[21] Appl. No.: 188,035

[22] Filed: Sep. 17, 1980

[51] Int. Cl.³ .............................................. G01B 11/275
[52] U.S. Cl. ........................................ 33/288; 33/203; 33/274; 356/155
[58] Field of Search ................... 33/288, 203.18, 203, 33/336, 337, 335, 203.19, 203.13, 203.12, 203.15, 274; 356/155

[56] References Cited

U.S. PATENT DOCUMENTS

| | | | |
|---|---|---|---|
| 2,249,226 | 7/1941 | Peters | 33/203.18 |
| 2,410,339 | 10/1946 | Creagmill . | |
| 2,641,957 | 6/1953 | Vendermeer . | |
| 2,755,554 | 7/1956 | MacMillan . | |
| 3,393,455 | 7/1968 | MacMillan | 33/288 |
| 3,409,990 | 11/1968 | Vorpahl | 33/288 |
| 3,501,240 | 3/1970 | Haynes . | |
| 3,575,047 | 4/1971 | Hunter et al. . | |
| 3,579,845 | 5/1971 | Hunter et al. . | |
| 3,587,325 | 6/1971 | Hunter et al. . | |
| 3,772,919 | 11/1973 | Senften . | |
| 3,782,831 | 1/1974 | Senften . | |
| 3,892,042 | 7/1975 | Senften . | |
| 4,034,479 | 7/1977 | Senften . | |
| 4,126,943 | 11/1978 | Senften . | |
| 4,142,299 | 3/1979 | Alsina | 33/288 |
| 4,185,917 | 1/1980 | Alsina . | |

Primary Examiner—William D. Martin, Jr.
Attorney, Agent, or Firm—Shlesinger, Fitzsimmons & Shlesinger

[57] ABSTRACT

Four alignment housings are mounted on a garage floor adjacent a conventional lift, so that when a vehicle has been elevated by the lift each of its four independently suspended four wheels will register with an alignment chart that is adjustably mounted on the face of each housing. A beam of light is directed through registering openings in each housing and its attached chart toward a mirror releasably mounted on each vehicle wheel. The mirrors reflect the beams back onto the associated charts, which are calibrated to provide camber, caster and toe-in readings. In one embodiment each housing contains a light source (for example a laser) which directs a beam onto a reflecting surface which is inclined at 45° to the horizontal, so that it projects the beam at right angles out of the housing toward the adjacent wheel. In a second embodiment only one housing at each side of a vehicle contains a light source, and the associated reflecting surface reflects only part of a light beam toward a wheel and permits the remainder to pass out of the housing to a reflective surface in the other housing located on the same side of the vehicle. By making each reflecting surface horizontally adjustable on its housing it is possible to adjust the reflecting surfaces horizontally for use in connection with vehicles having different wheel base lengths.

15 Claims, 8 Drawing Figures

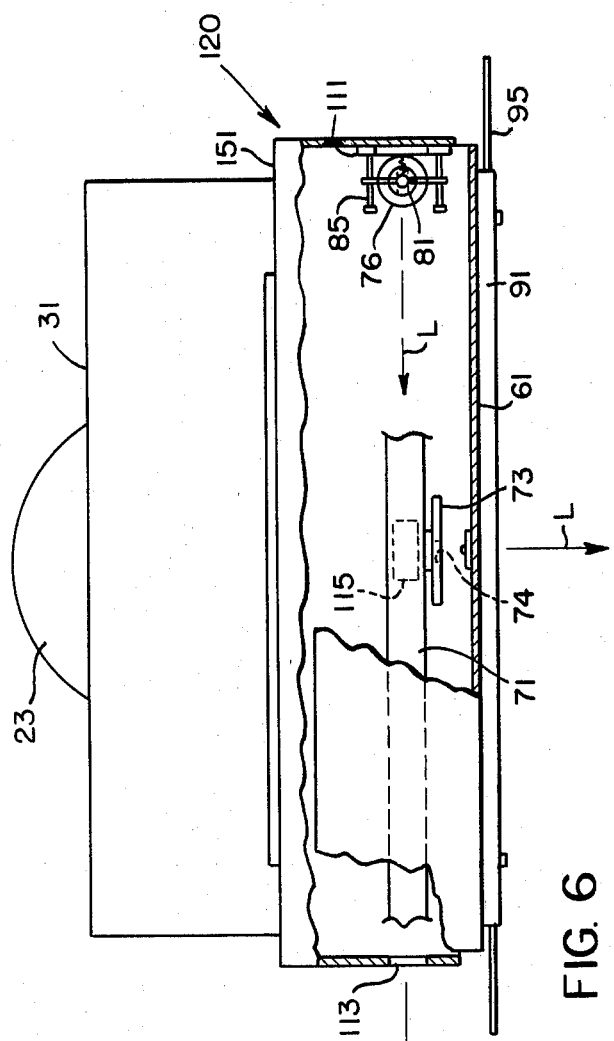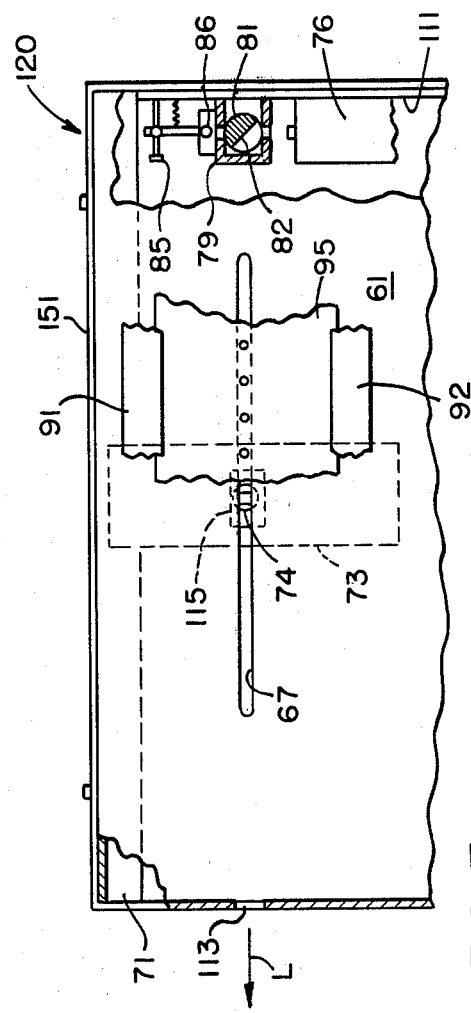
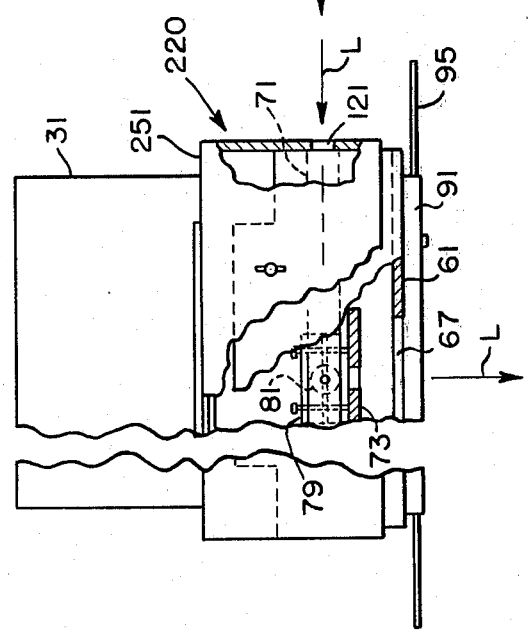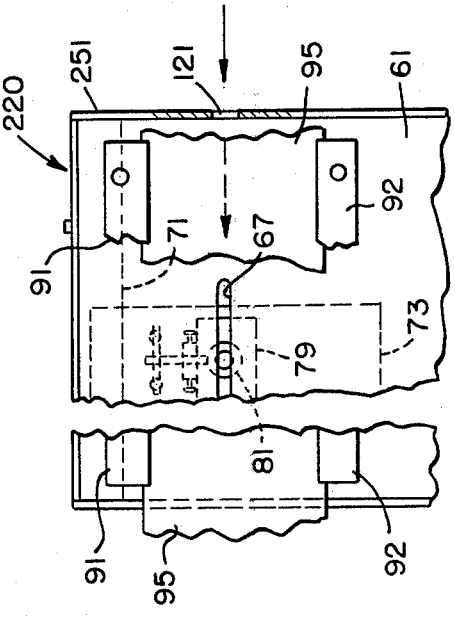
FIG. 6
FIG. 7

FOUR WHEEL ALIGNMENT METHOD AND APPARATUS FOR AUTOMOTIVE VEHICLES

This invention relates to alignment apparatus, more particularly to a novel method and apparatus for aligning all four wheels of an automotive vehicle.

There are numerous methods and devices available for use in checking the alignment of the two front wheels of an automotive vehicle, but heretofore there has been no satisfactory system for simultaneously checking the alignment of all four wheels. The necessity for such a system has become more pronounced with the recent mass production of autos with four wheel independent suspension. Moreover, even in the case of front wheel alignment methods, which could be duplicated or adapted for checking rear wheel alignment, the associated alignment apparatus has proved to be either inaccurate, or excessively complicated and expensive to operate and maintain.

U.S. Pat. No. 2,410,339, for example, discloses alignment apparatus which utilizes light beams reflected from wheel-mounted mirrors to indicate toe in, camber, etc.; and while such relatively simple apparatus could be duplicated for checking all four wheels of a vehicle, both the method and apparatus disclosed in this patent have proved to be inferior for modern autos. While substantially more accurate systems are disclosed by U.S. Pat. Nos. 3,579,845; 3,772,919; 3,782,831; 3,587,325; 3,575,047; 4,034,479; 4,126,943 and 3,892,042, each such system requires the use of rather sophisticated electronic equipment which requires frequent and expensive maintainance and/or repairs, and which in many cases attempts accuracy of measurements far in excess of that which is required to effect proper alignment.

It is an object of this invention, therefore, to to provide an improved method and apparatus for simultaneously checking the alignment of all four wheels of a four-wheeled automotive vehicle, while effecting extreme accuracy of measurements, but without having to employ complicated and expensive electronic equipment for taking and recording such measurements.

Another object of this invention is to provide improved alignment apparatus of the type described which is relatively simple and inexpensive to install and to operate.

A further object of this invention is to provide improved, uncomplicated alignment apparatus capable of being operated by a person of relatively low skills, and yet capable of affording very accurate measurements of toe in, caster and camber.

It is also an object of this invention to provide a novel guide member for assisting a vehicle operator in placing an automobile accurately relative to a garage hoist, or the like thereby to increase the accuracy of wheel alignment measurements, and also to assist in the detection of any misalignment in the frame of the vehicle itself.

Another object of this invention is to provide adjustable alignment apparatus which utilizes lasers and means for adjusting the beams thereof to register with the wheels of vehicles having different wheelbase measurements.

Other objects of the invention will be apparent hereinafter from the specification, and from the recital of the appended claims, particularly when viewed in conjunction with the accompanying drawings.

BRIEF SUMMARY OF THE INVENTION

In one embodiment of this invention four laser-supporting housings are fixed on pedestals adjacent each of the four corners of a garage hoist, so that when an automobile is lifted by the hoist each of its four wheels will register with one of the housing. Each housing contains a vertically disposed laser which directs a light beam vertically onto an inclined reflecting surface which is formed on a spherical member that is adjustable about its center to direct the beam horizontally out of the housing onto a mirror carried by the adjacent automobile wheel. The mirror reflects the beam back onto a chart mounted on the face of the housing, and calibrated to read toe in, camber and caster. Each laser and its associated reflecting member are mounted for adjustment horizontally and as a unit in each housing to enable autos with different wheelbases to be checked merely by adjusting the lasers longitudinally in their housings.

In a second embodiment two lasers are fixed in the two forward housings and project beams horizontally rearwardly toward beam splitters which are mounted for horizontal adjustment in the two forward housing. The beam splitters project portions of each beam at right angles out of the forward housings toward the front wheels of an auto and permit the remaining portions of the beams to pass horizontally and rearwardly onto two adjustable reflecting members which are mounted in the two rear housings and which are inclined so as to direct the remaining portions of the beams toward the two rear wheels of an auto.

BRIEF DESCRIPTION OF THE DRAWINGS

In the drawings

FIG. 6 is a fragmentary plan view generally similar to FIG. 1, but illustrating a pair of modified laser and card supporting housings made according to a second embodiment of this invention, portions of these modified housings being broken away and shown in section;

FIG. 7 is a fragmentary front elevational view of these modified housings with portions thereof being broken away and shown in section.

DETAILED DESCRIPTION OF THE INVENTION

Figure 1:
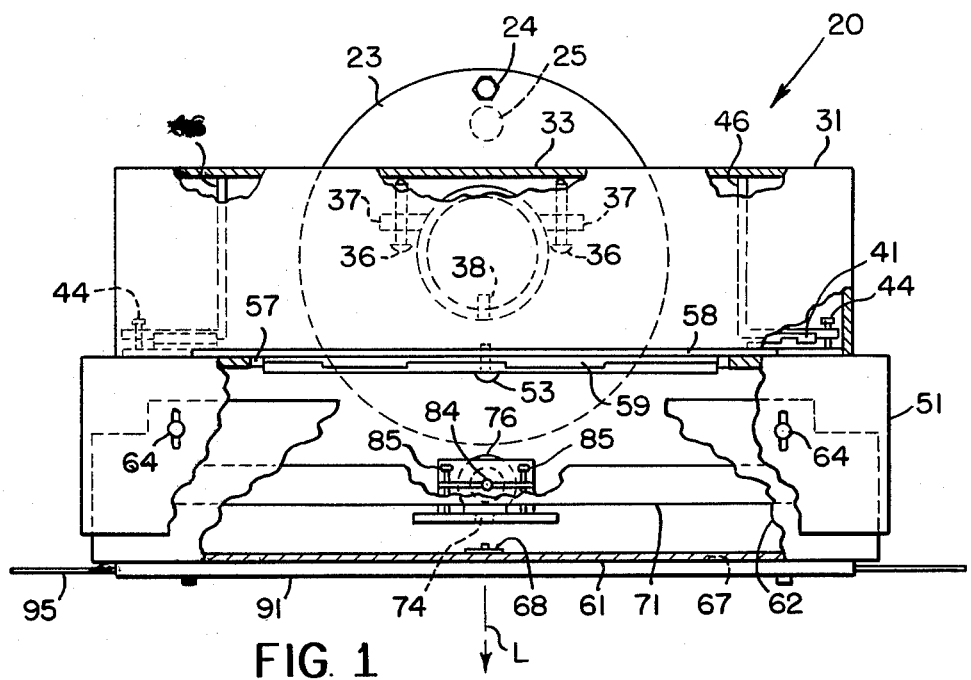
FIG. 1 is a plane view of novel laser and chart supporting housing which forms part of the apparatus used for aligning automotive wheels in accordance with one embodiment of this invention, portions of the housing being broken away and shown in section for purposes of illustration.

Referring now to the drawings by numerals of reference, and first FIGS. 1–3, 20 denotes generally a housing which, as noted in greater detail hereinafter, is designed to support a light source in the form of a laser, and a chart which is used for indicating wheel toe in, camber and caster. Housing 20 is supported on a tubular post or pedestal 22, the lower end of which has integral therewith an enlarged, circular support plate 23 which is adapted to be secured by bolts 24 on the floor F of a garage, or the like. A plurality of leveling feet 25 are threaded into the underside of plate 23 for use in positioning the plate horizontally before it is fastened to the floor. A mounting sleeve 27 is fixed in its lower end in the bore of the post 22 coaxially thereof by means of a plurality of set screws 28, and a solid pin 29, which projects through registering openings in the post 22 and sleeve 27, respectively.

Fixed on the upper end of sleeve 27, which projects above the post 22, is a generally rectangular cabinet or housing support 31, which has a vertically disposed sleeve 32 welded or otherwise secured in the center of its rear wall 33. Sleeve 32 is seated slidably and coaxially over the upper end of sleeve 27 so that the upper end of the latter seats against the top wall 34 of support 31. Support 31 is secured against rotational movement about the sleeve 27 by means of a pair of spaced set screws 36, which are carried by a pair of lugs 37 that project from opposite sides of the post 22 adjacent its upper end. The tips of the screws 36 engage the inside surface of the rear wall 33 of the support 31, so that by proper adjustment of the screws 36 the support 31 can be fixed in any desired position angularly about the axis of post 22. When the support 31 is in the desired angular position, as noted hereinafter, a pin 38 is press fit or otherwise inserted in registering openings in the sleeves 27 and 32 to prevent any relative rotation therebetween.

Figure 2:
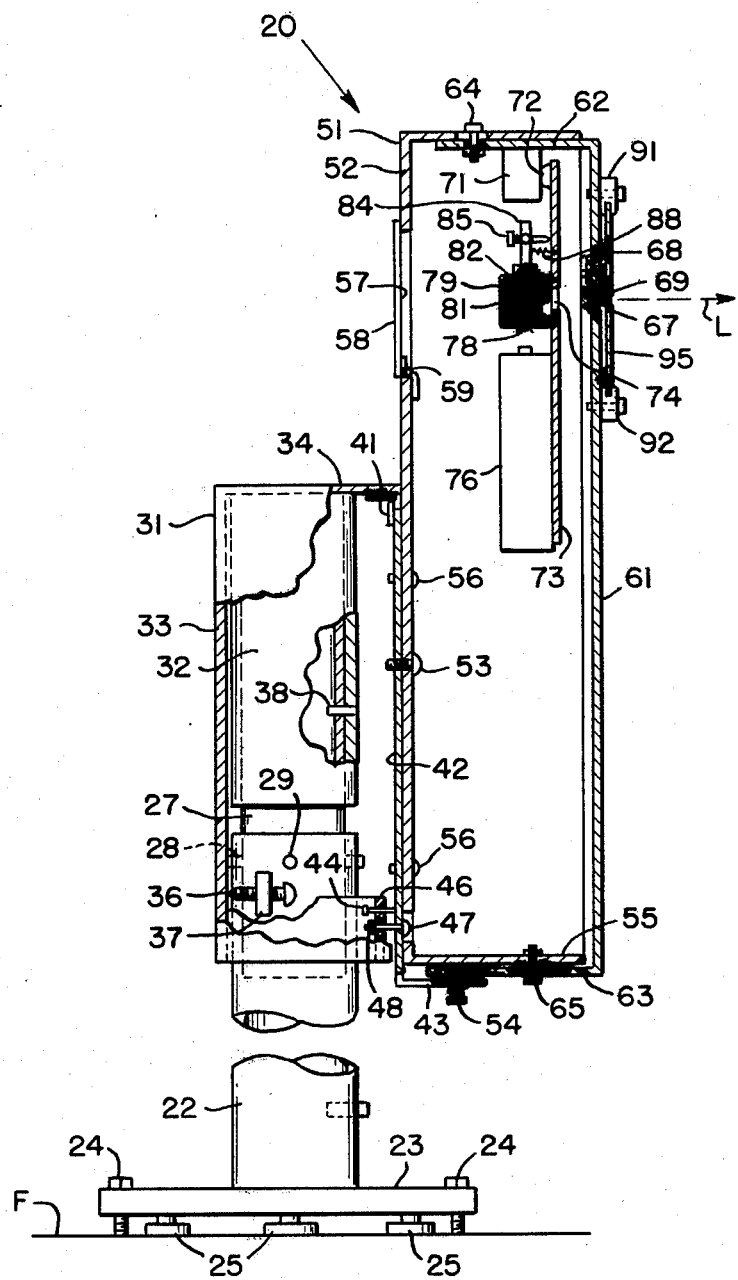
FIG. 2 is a fragmentary side elevational view of this housing and its associated supporting pedestal, portions of the housing and pedestal being broken away and shown in section.

Pivotally connected along its upper edge by a hinge 41 to the upper wall 34 of the support 31 is an adjustable plate or panel 42, which projects downwardly beyond support 31 and terminates in a right-angular flange 43 that projects laterally and away from the post 22. In practice it is desired to have panel 42 positioned in a vertical plane. It is therefore engaged adjacent its lower edge with the ends of a plurality of adjusting screws 44 (two in the embodiment illustrated), which are threaded into one of the legs of a pair of right-angular brackets 46, which are fastened to the bottom of the support 31 adjacent each end thereof. The panel 42 is secured against the ends of the adjusting screws 44 by a plurality of bolts 47 (only one of which is shown in FIG. 2), which extend through registering openings in the panel 42 and the bracket 46, where they are secured by nuts 48.

Housing 20 comprises a generally rectangular casing 51 having a plane back wall 52. A large screw 53 extends slidably through an opening in the back wall 52 and threads into a tapped hole formed in the center of panel 42. As noted hereinafter, cabinet 51 is first mounted on the panel 42 by the screw 53, after which it is adjusted into a desired angular position about the axis of this screw by means of a plurality of adjusting screws 54, which thread into the flange 43 on the panel 42 to engage the bottom wall 55 of casing 51. After casing 51 has been adjusted into its desired position it is fastened securely against panel 42 by means of a plurality of screws 56.

Casing 51 projects above support 31 and has therein an elongate, generally rectangular opening 57. This opening is covered by a spring-loaded cover plate 58, which is pivotally connected along its lower edge to the back wall 52 of the casing by means of a conventional hinge 59.

The open end of casing 51 is closed by a vertically disposed cover plate 61, which has integral with its upper and lower edges, respectively, a pair of spaced, parallel, rearwardly-projecting flanges 62 and 63. Flange 62 is secured to the top of casing 51 by a plurality of bolts 64, which project through registering slots in the casing 51 and flange 62. Flange 63 on plate 61 passes beneath casing 51 between the panel flange 43 and the casing wall 55, where it is secured to the latter by a plurality of bolts 65. Adjacent its upper edge cover plate 61 has intermediate its side edges an elongate slot 67, which extends parallel to the upper edge of cover 61, and which is located centrally of the cover. Secured by a small bracket 68 (FIGS. 1 and 2) to the back of plate 61 adjacent the upper edge of its slot 67, and projecting downwardly behind the slot centrally thereof are the two, spaced, parallel legs of a generally U-shaped wire loop 69. The two legs of the loop 69 are equi-spaced from the midpoint of slot 67 for a purpose noted hereinafter.

Secured to the inside surface of the cover flange 62, and extending longitudinally of casing 51 parallel to the slot 67 is an elongate bearing housing 71. Mounted for horizontal sliding movement in the housing 71, and projecting from one side thereof, is a slide 72. Fastened at its upper end to slide 72, and projecting downwardly therefrom in spaced, parallel relation to the cover 61 is a rigid hanger plate 73. In its center plate 73 has a circular opening 74, which registers with the slot 67 regardless of the position of the slide 72 along the bearing housing 71.

Secured to the back of the hanger plate 73 with its light emitting end facing upwardly is a laser 76. This laser directs a beam of light upwardly through an opening 78 in the bottom of a generally rectangular housing 79 onto a spherical reflecting member 81, which may be of the type disclosed in my U.S. Pat. No. 4,142,299. Member 81 has therein a diametral slot, the bottom of which is a plane surface 82 which is coated with a reflective material, and which lies in a plane that is inclined at an angle of forty-five degrees to the beam of light emanating from the laser 76, and to a vertical plane through the center of the cover slot 67. As a consequence, light from the laser 76 is projected by the surface 82 horizontally outwardly through the registering opening 74 in hanger plate 73 and slot 67 in the casing cover 61. Moreover, since the laser 76 and member 81 are fixed relative to one another, and since both travel with the hanger 73 as the slide 72 is shifted in housing 71, the light beam reflected from surface 82 will register with the center of the slot 67 regardless of the position of slide 72 and hanger 73 longitudinally of the housing 20.

Also as in the case of the spherical reflecting member disclosed in the above-noted patent, member 81 has an integral, upstanding shaft 84, which is adjustable relative to a vertical axis by two sets of adjusting screws 85 and 86, respectively. The screws 86 thread into a ring through which the shaft 84 passes, and engage diametrally opposite sides of the shaft along an axis that extends at right angles to the axes of the other two adjusting screws 85, which are carried in opposite ends of a pin 87 that projects from diametrically opposite sides of shaft 84 adjacent its upper end. The operating ends of screws 85 are held against the rear surface of the hanger plate 73 by a tension spring 88 (FIG. 2), which is attached at one end of the plate 73 and at its opposite end to shaft 84 intermediate its ends. As noted in greater detail in the above-noted patent, the adjusting screws 85 and 86 are used for the fine adjustment of member 81 about its axis in order to cause the reflected laser beam to project centrally through opening 74 and slot 67.

Bolted or otherwise secured to the outer face of the cover 61 adjacent its upper edge are two, spaced, parallel, horizontally disposed card-supporting members 91 and 92. The confronting surfaces of members 91 and 92 have therein registering, longitudinally extending grooves 93 and 94, respectively, in which are slidably guides the opposed side edges of a rectangular alignment chart or card 95. Card 95 has therethrough a plurality (thirteen in the embodiment illustrated) of equispaced, circular openings 96, the centers of which lie on a common axis which is disposed in horizontal registry with the axis of the slot 67 in the cover 61. Adjacent opposite ends, respectively, the face of the card has marked thereon a series of graduations which are denoted generally at 97, and which are used for measuring caster. Intermediate its ends the face of the card is provided with a series of graduations (not illustrated), which are designed to be used with a particular opening 96 in the card, depending, as noted hereinafter, on the distance from a respective card 95 to the reflective surface that is mounted on the adjacent wheel that is to be checked.

Figure 3:
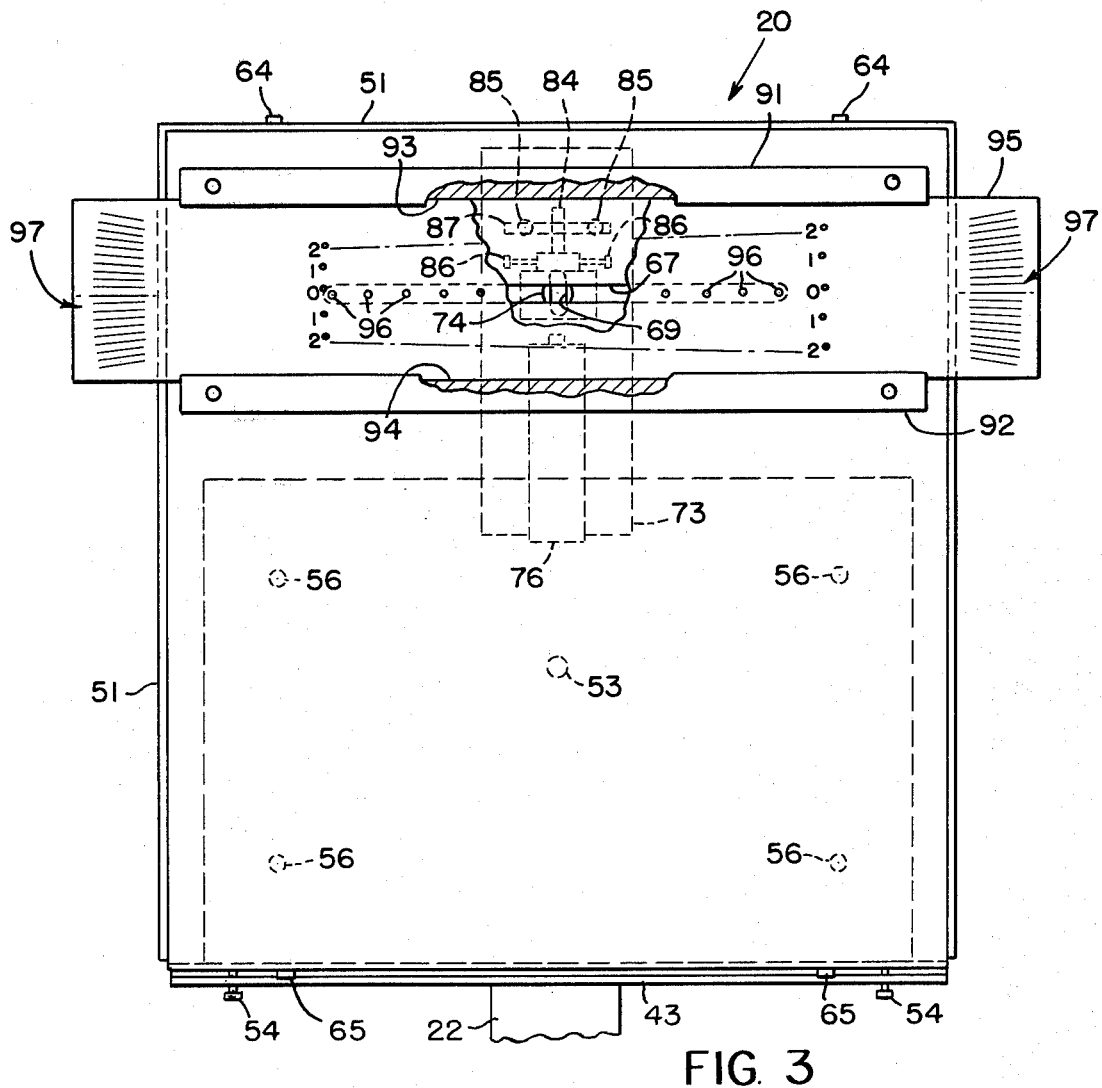
FIG. 3 is a fragmentary, front elevational view of this housing and pedestal with parts thereof cut away.
Figure 4:
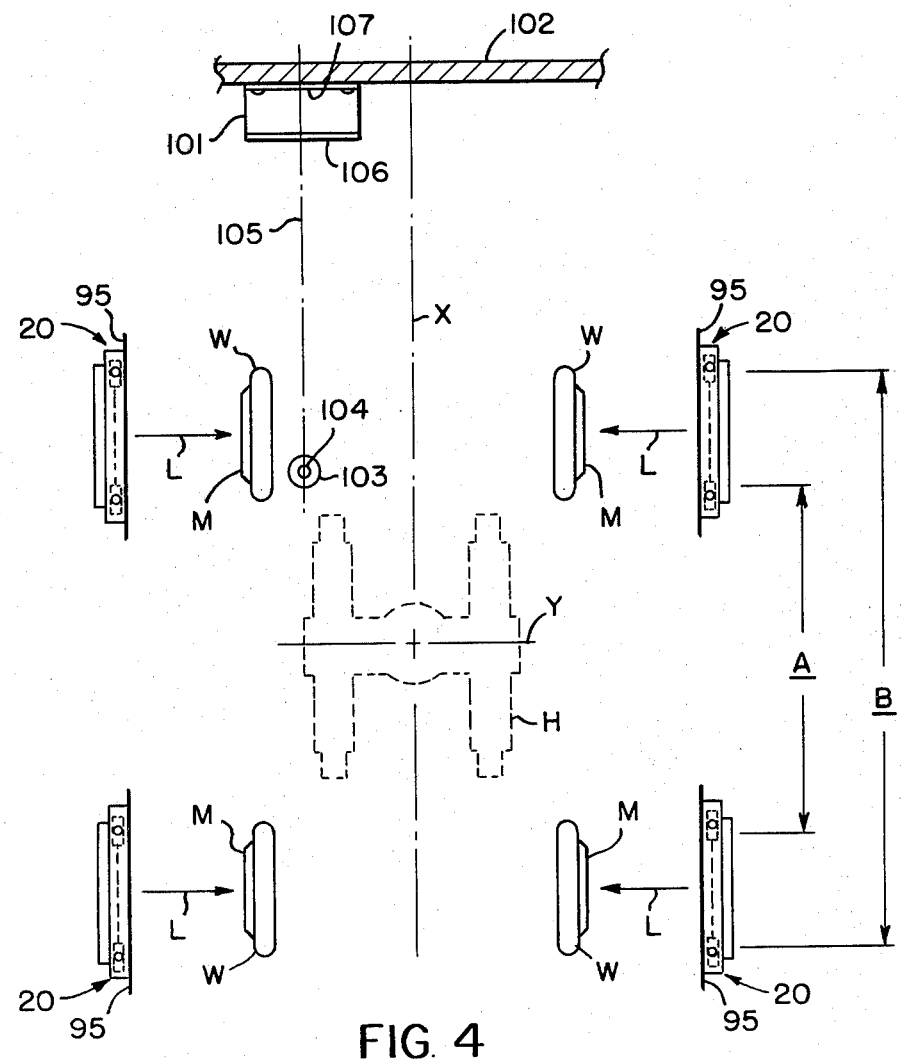
FIG. 4 is a schematic plan view illustrating one manner in which housing and associated pedestals of the type described can be employed for aligning all four wheels of a vehicle.

FIG. 4 illustrates schematically one manner in which alignment apparatus of the type shown in FIG. 1 to 3 can be employed for checking the alignment of all four wheels of an automotive vehicle. As shown in this Figure, four of the housings 20 are mounted by their respective pedestals in rectangularly spaced relation around a conventional garage lift or hoist H, which can be used for elevating a vehicle as noted hereinafter. Typically, and merely by way of example, the two pedestals at each side of the hoist H are spaced approximately seventy-one inches from its longitudinal axis or centerline X (FIG. 4), while the two housings 20 adjacent each of the forward and rear ends, respectively of the hoist H are spaced approximately fifty-two inches from its transverse centerline Y. The sleeves 27 for each of these four pedestals are then inserted into the associated posts 22 and locked in place by the set screws 28 and pin 29 after the upper ends of all four sleeves 27 have been elevated at least approximately eleven inches above the upper ends of the associated posts 22, and have been positioned in a common horizontal plane. The cabinet 31 for each housing 20 is then mounted on the associated sleeve 27 by inserting its mounting sleeve 32 over the upper end of the associated sleeve 27, and the two housings 20 at each side of the hoist H are then aligned so that their backs or outer surfaces are positioned in registry with one another in a common vertical plane. These adjustments can be made by manipulating the screws 36, after which the pin 38 can be inserted through each sleeve 32 and the associated support wall as shown in FIG. 2.

After this has been done the hinged panels 42 are positioned in vertical planes by adjusting the associated screws 44, after which each panel 42 is locked in place by the nut and bolt combinations 47, 48. The back of each housing 20 is then fastened by a bolt 53 to the center of its associated panel 42, and then is adjusted by the screws 54 on the associated panel flange 43 to place its associated bearing housing 71 horizontally. Each housing 20 is then secured in place on the associated support panel 42 by screws 56. The cover 58 on the back of each housing 20 can then be opened to permit adjustment of the screws 85 and 86 for each reflecting member 81 until the beam from the associated laser 76 is projected by a respective member 81 horizontally outwardly through the registering housing opening 74 in the associated hanger plate 73, the slot 69 in cover plate 61, and through one of the small apertures 96 in the associated chart 95. These adjustments are made until the two light beams from the two forward or upper housings 20 as shown in FIG. 4 are positioned coaxially, as can be noted when the beam from the housing 20 on the left side of FIG. 4 registers through one of the openings 96 in the card 95 on the right hand housing 20. The same procedure, of course, is followed to position the light beams L from the two rear housings 20 (the two lower housings in FIG. 4) coaxially of each other. The manner in which these adjustments are made to place the opposed laser beams in registry with each other will be readily apparent to one skilled in the art, and also by reference to the teachings in the above-noted U.S. Pat. No. 4,142,299.

After the members 81 have been adjusted so that the opposed beams L register coaxially with one another, the respective slides 72 in the housings 20 are adjusted horizontally along their associated bearing housing 71 to make sure that the projected beams L travel horizontally, and in alignment with the associated slots 67 in the housing covers 61. Further slight adjustments might be necessary in order to make sure that these beams travel horizontally.

After proper adjustment of the mechanisms to assure the horizontal disposition of the beams L, and the vertical disposition of the lasers 76, an automobile can then be positioned on the hoist H in order to place its wheels W (FIG. 4) approximately in registry with the four housings 20. To help assure that the longitudinal axis of the associated vehicle is positioned parallel to the longitudinal axis X of the hoist H, a guide member 101 is adapted to be fastened to the inside surface of a garage wall 102, or the like, and with its midpoint positioned approximately fifteen inches to one side (the left side in FIG. 4) of the axial center line X of the hoist H. The operator of the vehicle then releasably attaches to the top of his or her dashboard, by means of a conventional suction-cup base 103, a vertically disposed pointer rod 104, which is also located approximately fifteen inches to the left of center of the dashboard, so that the pointer 104, if the car is properly positioned, will register with the midpoint of the guide 101, for example along the axis 105 as shown in FIG. 4.

Figure 5:
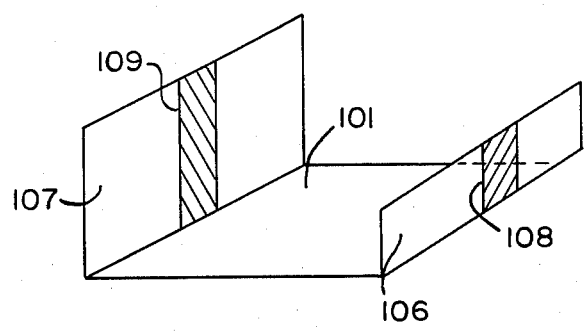
FIG. 5 is a perspective view of a novel sighting or auto aligning device which can be employed with this invention.

To assist the operator in aligning the pointer 104 with the center of the guide 101, the forward wall 106 of the guide is slightly smaller than the rear wall 107 thereof; and as shown in FIG. 5, the central portion 108 of the front wall 106 is shaded or painted with a contrasting color as compared to the corresponding portion 109 of the rear wall 107, so that as an operator drives a vehicle onto or immediately above the hoist H, he or she may align the pointer 104 with the two, contrasting shaded portions 108 and 109 of the guide member 101. By properly aligning the pointer 104 vertically with the midpoints of the shaded portions 108 and 109 it is possible to position the associated vehicle centrally on the hoist H, so that the axial centerline of the associated vehicle will be substantially parallel to the axis X of the hoist H.

After the vehicle has been positioned on the hoist H, and the latter has been raised to position the wheels W of the vehicle in registry with the charts 95 on the four housings 20, conventional mirrors M or reflecting devices are attached to the wheels and are properly adjusted to be positioned coaxially of the respective axis of rotation of a wheel as taught, for example, in applicant's U.S. Pat. No. 4,185,917 or his pending U.S. application No. 144,978, filed Apr. 30, 1980, and assigned to the same assignee as the instant application.

Before taking the usual toe in, camber and caster readings, the horizontal distance from the surface of a respective mirror M to its associated card or chart 95 is determined, after which the associated card 95 is shifted in its guides 91, 92 until a predetermined aperture 96 therein registers with the beam of light L emanating from the associated reflecting member 81. The reason for this is that the distance of each card 95 from its associated mirror M may vary from automotive vehicle to automotive vehicle, depending upon the respective width of the vehicle. Compensation for these changes could be made by shifting the charts toward or away from the associated wheel W and the mirror M thereon. However, by employing in each card 95 a plurality of equi-spaced apertures 96, each of which is associated with a different group of indicia for toe in and camber measurements, and wherein each such group of indicia is calibrated for use with a predetermined distance between a card 95 and the associated mirror M, it is possible to secure the desired readings merely by shifting each chart 95 one way or another in the guides 91, 92 rather than moving the charts toward or away from the respective wheels.

It will be apparent that by mounting each laser 73 for adjustment longitudinally on its associated bearing 71 in each housing 20, it is possible to use the four housings in conjunction with vehicles of different lengths. For example, the lasers can be shifted as shown in FIG. 4 to their extreme positions adjacent the confronting ends of the housings 20 at each side of the hoist H, so that the apparatus can be used in conjunction with, merely by way of example, a minimum wheelbase of seventy-six inches (letter A in FIG. 4); while the lasers can also be shifted outwardly to their outermost positions (letter B in FIG. 4), thereby permitting use of the same apparatus for vehicles having wheelbases measuring upwardly of one hundred and twenty-eight inches.

From the foregoing it will be apparent that the present invention provides a novel method and extremely compact and relatively inexpensive apparatus for checking the alignment of all four wheels of an automotive vehicle. By mounting the lasers 76 for longitudinal adjustment in their housings 20, it is possible to employ the same apparatus in conjunction with automotive vehicles of different lengths or wheelbases. Likewise, by mounting the associated charts 95 for adjustment into various positions, in each of which one of the apertures 96 can be selected to provide toe in and camber proper readings, depending upon the distance of the chart from the associated wheel-mounted mirror M, it is possible to fix each housing 20 in a permanent position, thus minimizing the possibility of errors which might otherwise result from adjusting the overall apparatus, as distinguished from adjusting only the associated laser 76 and chart 95, which are guided for very accurate adjustment on their respective housings.

The cross hairs 69 in each housing 20 have been provided merely for assisting in the recalibration of a respective reflective member 81, if it should accidentally be jarred out of alignment during use of the apparatus.

Figure 8:
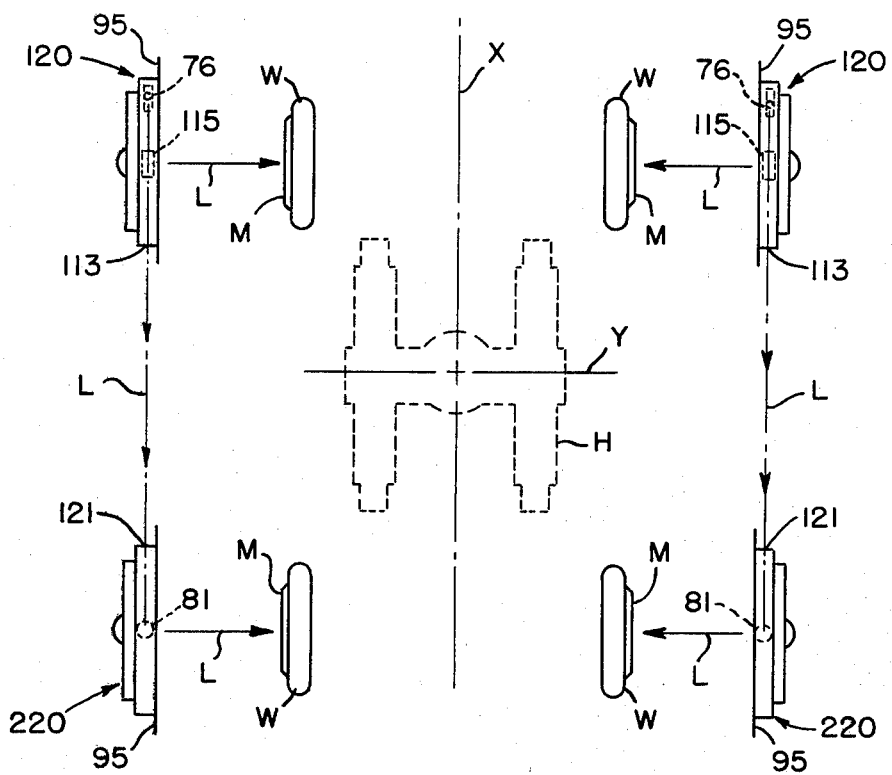
FIG. 8 is a schematic plan view showing one manner in which these modified housings can be employed for balancing all four wheels of an automotive vehicle.

In the embodiment shown in FIGS. 6 to 8 only two rather than four lasers 76 are employed. The elimination of two lasers is made possible by fixing one laser in each of the forward or front housing which are adapted to register with the front wheels of a vehicle. Each of the lasers projects its beam horizontally rearwardly onto a beam splitter, which is mounted for longitudinal adjustment in the same front housing. The beam splitter directs part of the light beam at right angles and outwardly through the housing onto one of the front wheels of a vehicle, and permits the remaining portion of the beam to pass through the splitter and an opening in the end wall of the front housing into the registering rear housing, which is aligned with a rear wheel at one side of a vehicle. The light beam entering the rear housing is projected onto a spherical reflecting member of the type referred to in the first embodiment, and which has its reflecting surface inclined at forty-five degrees to the incoming light, so that the latter is reflected at right angles laterally out of the rear housing and directly toward the associated rear wheel of a vehicle.

Referring now to FIGS. 6 to 8, wherein like numerals are employed to denote elements similar to those employed in the first embodiment, 120 denotes generally a forward or front laser supporting housing which, as in the case of the first embodiment, is mounted on a support 31 that is carried on the upper end of the usual pedestal 22 (not illustrated). Housing 120 comprises a casing 151 the open end of which is closed by a cover plate 61 in a manner similar to the first embodiment. Plate 61 has therein the usual longitudinally extending slot 67, and has fastened to its upper end the longitudinally extending bearing housing 71. Unlike the first embodiment, however, the laser 76 is not suspended from bearing 71. Instead, it is fastened to a support plate 111 (FIGS. 6 and 7) which is secured to the inside of the forward or right hand end wall of the cabinet 151.

This particular laser 76 faces upwardly to project a beam of light onto the inclined reflecting surface 82 of a spherically-shaped reflecting member 81, which, as in the case of the first embodiment, is adjustably mounted in a housing 79 that is attached to the plate 111 immediately above the laser 76. As shown more clearly in FIG. 7, reflecting surface 82 of this member 81 is inclined at approximately forty-five degrees to the horizontal, and faces rearwardly toward a registering opening 113 that is formed in the rear wall of the casing 151.

This embodiment also includes an adjustable hanger plate 76, which is fastened at its upper end to the slide which projects from the bearing housing 71, and which carries on its lower end a beam splitter 115, which is positioned between the reflecting member 81 and the opening 113 in the back of the casing 151. The beam splitter 115 is mounted in such a manner that any light projected thereon from the reflecting member 81 will be split into two beams extending at right angles to each other, one portion of the beam being projected by the beam splitter horizontally and laterally outwardly through the slot 67 in the cover plate 61, as shown for example by the downwardly directed arrow in FIG. 6, while the remaining portion of light continues to travel in a straight line through the beam splitter 115 and out of the opening 113 in the rear end of the housing 120 toward another housing 220, which as shown in FIGS. 6 and 7 is positioned to the left of the rear of the housing 120.

Housing 220 comprises a casing 251, which is mounted in the usual manner on a support 31, and which has in its forward or right hand end, as shown in FIGS. 6 and 7, an aperture 121, which is positioned to register with the aperture 113 in the forward housing 120. Suspended from an elongate bearing 71 for adjustment longitudinally of the housing 220 is the usual hanger plate 73. Fastened to the back of plate 73 is a rectangular housing 79, which contains a spherical reflecting member 81, the reflecting surface of which registers with both the slot 67, the front of casing 251, and the opening 121 in the forward end of this casing. Also, the reflecting surface on this member 81 is inclined at an angle of approximately forty-five degrees to the beam L coming from the beam splitter 115, whereby the light entering housing 220 is reflected at right angles out of the slot 67 in its cover 61, (downwardly in FIG. 6) and toward the rear wheel of a vehicle, as noted hereinafter.

In use, two of the housings 120 are mounted at opposite sides of a hoist H adjacent its forward end, as shown for example in FIG. 8, while two of the housings 220 are mounted at opposite sides of the hoist adjacent its rear end. As in the case of the first embodiment, the housings 120, 220 at each side of the hoist are carefully mounted so that they are in proper registry with each other, for example in the manner as described in connection with the first embodiment as illustrated in FIG. 4. In the case of the embodiment shown in FIG. 8, however, care must be taken to see to it that the opening 113 in the rear end of each forward housing 120 is in proper registry with the beam inlet opening 121 in the corresponding rear housing 220.

During the use of this equipment beams from the lasers 76 (FIG. 8) in the forward ends of the front housing 120 are directed upwardly onto reflecting member 81, and then horizontally rearwardly by the reflecting surfaces 82 through the beam splitters 115. Portions of these beams pass horizontally rearwardly through the respective splitters 115, and the remaining portions of the beams are projected at right angles inwardly toward each other, and onto the mirrors or other reflecting members M that are mounted on the outside surfaces of the two front wheels of the vehicle that is being checked. The portions of the light which pass rearwardly through the beam splitters 115 and the casing opengins 113 enter the inlet openings 121 and are directed onto the associated reflecting members 81 in the rear housings 220. Although these rear reflecting members 81 can be adjusted longitudinally in their respective housings 220, each is positioned so that their reflecting surfaces will cause said remaining portions of the light beams to be projected at right angles inwardly toward each other, and onto the mirror elements M mounted on the rear wheels of a vehicle. Thus by employing the longitudinally adjustable beam splitters 115 in the forward housing 120 and the associated, longitudinally adjustable reflecting members 81 in the rear housings 220, it is possible to eliminate at least two of the lasers 76 required by the embodiment shown in FIG. 4. Since each laser element 76 is extremely expensive, the embodiment shown in FIG. 8 provides a somewhat more inexpensive apparatus for performing essentially the same functions afforded by the apparatus of FIG. 4.

Still another advantage of the embodiment shown in FIGS. 6 to 8 is that, once the beam splitters 115 are mounted for travel beneath the associated bearing housings 71, it is not necessary to adjust the splitters each time that one of the associated reflecting members 81 in the forward or rear housings are adjusted. Moreover, in the case of the first embodiment, automotive vehicles of differing wheel bases can be checked merely by shifting the beam splitters 115 and the rear reflecting elements 81 longitudinally of their respective housings. Also, it will be understood that, as in the case of the first embodiment, the respective charts 95 (FIG. 8) are adapted to be shifted selectively to place one of their 96 apertures in registry with the associated beam splitter 115 or reflecting element 81, depending upon the linear distance between a respective chart 95 and the mirror M on the associated wheel W.

Moreover, while this invention has been illustrated and described in detail in connection with only certain embodiments thereof, it will be apparent that it is capable of still further modification, and that this application is intended to cover any such modifications as may fall within the scope of one skilled in the art or the appended claims.

What I claim is:

1. A method of checking the alignment of all four independently suspended wheels of an automotive vehicle and the like, comprising
    positioning two pairs of spaced reflecting members adjacent opposite sides, respectively, of a space that is to be occupied one at a time by automotive vehicles of differing widths and wheel base lengths,
    supporting the two reflecting members of each pair of limited reciprocation in aligned, horizontal paths, and generally parallel to the length of a vehicle positioned in said space,
    after a vehicle has been positioned in said space, adjusting each of said members along its respective horizontal path, thereby to place a reflecting surface thereon in confronting relation with a wheel on said vehicle, and in a plane inclined to the plane containing said wheel, and in lateral registry with the reflecting surface on one of the members positioned at the opposide side of said space, and
    directing a beam of light onto each of said reflecting surfaces in such manner that each beam is reflected by one of said surfaces horizontally toward an adjacent wheel on said vehicle.

2. A method as defined in claim 1, including using four separate lasers for supplying a separate light beam for each of said reflecting members.

3. A method as defined in claim 1, including
    one member of each pair thereof is a beam splitter and the other member comprises a solid member having said reflecting surface thereon, and
    two lasers are employed to direct parallel light beams onto said two beam splitters at each side of said space, and
    utilizing said beam splitters to direct portions of said parallel light beams onto two wheels of said vehicle, and to direct the remaining portions of said parallel beams onto said other reflecting members of said pairs.

4. Apparatus for checking the alignment of independently suspended front and rear wheels of an automotive vehicle, comprising
    a first pair of spaced beam directing members mounted adjacent opposite sides of a space disposed to be occupied by an automotive vehicle, and operable to project a pair of horizontal light beams coaxially toward each other and onto the two front wheels of a vehicle in said space, a second pair of spaced beam directing members spaced from said first pair and mounted adjacent opposite sides of said space to project a second pair of horizontal light beams coaxially toward each other parallel to said first pair of beams and onto the two rear wheels of the vehicle in said space, means mounting at least one of said members of each pair thereof for horizontal adjustment thereby to adjust the horizontal distance between said parallel beams in correspondence with the length of the vehicle positioned in said space, and an alignment chart positioned adjacent each of said members to have the light beam from the associated member reflected rearwardly from a vehicle wheel and onto the face of the chart, each of said charts having alignment graduations can the face thereof disposed to be in accordance with the point where the reflected light beam strikes the face of the chart.

5. Apparatus as defined in claim 4, including
at least two sources of collimated light, and
each of said first and second pairs of members having thereon a reflective surface positioned in the path of, and inclined to, a beam of light from one of said sources thereby to reflect said beam onto one of said wheels of a vehicle in said space.

6. Apparatus as defined in claim 5, wherein said reflective surfaces on two of said members allow part of the collimated light beam from a source thereof to pass through said two members, and the reflective surfaces on the other two members reflect all of the light falling thereon from a collimated light beam.

7. Apparatus as defined in claim 4, wherein
each of said charts has thereon a plurality of sets of graduations, each of which sets is calibrated for use in checking the alignment of a vehicle wheel that is positioned a predetermined horizontal distance from the associated chart, and
means for adjusting each chart, when a change in the horizontal distance between the chart and an associated vehicle wheel occurs, thereby to select the proper set of graduations on said chart for use in checking the alignment of said wheel.

8. Apparatus as defined in claim 7, wherein
each of said charts has therein a plurality of horizontally spaced openings registrable selectively with the beam of light emanating from the associated beam directing member, and
each of said sets of graduations is associated with a different one of said openings in the associated charts.

9. Apparatus for use in aligning the wheels of an automotive vehicle, comprising
a housing having a front wall and an opening in said front wall,
means for supporting said housing in spaced confronting relation to one wheel of an automotive vehicle, and with said front wall and the opening therein disposed to register with said wheel,
a chart mounted on the exterior of said front wall over said opening to confront said one wheel of the vehicle and having on its face a plurality of alignment indicia, a reflecting member mounted in said housing for registry with said opening and for horizontal adjustment, into one of a plurality of different operating positions,
means for directing a beam of light onto said reflecting member,
said member having thereon a plane reflecting surface inclined to said front wall of said housing, and being operative to project at least a portion of said beam of light horizontally through said opening and a hole in said chart toward said one wheel of the vehicle,
said chart having therein a row of spaced openings which register with said opening in said front wall of said housing, and
said chart being mounted for adjustment on said front wall selectively to position a different one of said openings in the chart in registry with said reflecting surface on said member each time said member is shifted from one to another of its operating positions.

10. Apparatus as defined in claim 9, wherein
said means for directing a beam of light onto said reflecting member comprises a light source mounted in said housing for horizontal adjustment with said reflecting member, and
said reflecting surface on said member is non-transmissive and reflects all of said light beam toward said one wheel.

11. Apparatus for use in aligning the wheels of an automotive vehicle, comprising
a housing having a front wall and an opening in said front wall,
means for supporting said housing in spaced confronting relation to one wheel of an automotive vehicle, and with said front wall and the opening therein disposed to register with said wheel,
a chart mounted on the exterior of said front wall over said opening to confront said one wheel of the vehicle, and having on its face a plurality of alignment indicia,
a reflecting member mounted in said housing for registry with said opening and for horizontal adjustment, and
means for directing a beam of light onto said reflecting member,
said member having thereon a plane reflecting surface inclined to said front wall of said housing, and being operative to project at least a portion of said beam of light horizontally through said opening and a hole in said chart toward said one wheel of the vehicle,
said means for directing a beam of light onto said reflecting member comprising a light source in said housing, and
said reflecting member comprising a beam splitter having a reflective surface which reflects a portion only of said beam toward said one wheel, and allows the remaining portion of the beam to pass therethrough.

12. Apparatus as defined in claim 9, wherein said supporting means comprises
a vertical post fixed at its lower end to a stationary surface,
a cabinet secured on the upper end of said post and having thereon a panel adjustably secured in a predetermined vertical plane, and means securing said housing on said penal with said front wall of said housing extending parallel to said panel.

13. Apparatus as defined in claim 12, including a pair of spaced parallel guide elements secured to the exterior of said front housing wall adjacent opposite sides, respectively, of said opening, said chart having the opposed, longitudinal side edges thereof slidably guided in grooves formed in the confronting surfaces of said elements.

14. Apparatus for use in aligning the wheels of an automotive vehicle, comprising
   a housing having a front wall and an opening in said front wall,
   means for supporting said housing in spaced confronting relation to one wheel of an automotive vehicle, and with said front wall and the opening therein disposed to register with said wheel,
   a chart mounted on the exterior of said front wall over said opening to confront said one wheel of the vehicle, and having on its face a plurality of alignment indicia,
   a reflecting member mounted in said housing for registry with said opening and for horizontal adjustment, and
   means for directing a beam of light onto said reflecting member,
   said member having thereon a plane reflecting surface inclined to said front wall of said housing, and being operative to project at least a portion of said beam of light horizontally through said opening and a hole in said chart toward said one wheel of the vehicle,
   said reflecting member comprising a beam splitter,
   said housing having in one end wall thereof a second opening which registers with said beam splitter, and
   said light beam directing means including a light source in said housing and operative to direct a beam of collimated light along an axis extending through said beam splitter and said second opening in said housing,
   said beam splitter being operative to project said portion of said beam latterally through the first-named opening in said housing onto said one wheel, and to permit the remaining portion thereof to pass out of said second opening in said housing.

15. Apparatus as defined in claim 14, including
   a second housing spaced from the first-named housing and having a front wall with an opening therein disposed to face a second wheel on said vehicle, and having in one end thereof a second opening disposed in confronting registering relation with said second opening in said end wall of said first-named housing,
   said second housing including a second reflecting member registering through said second openings in said housings with said beam splitter in said first housing, and
   said second reflecting member being mounted for horizontal adjustment into different positions longitudinally of said opening in said front wall of second housing, and having thereon a plane reflecting surface inclined to the path of light emanating from said first-named housing and operative to reflect said remaining portion of said light laterally onto said second wheel on said vehicle.

* * * * *